(12) United States Patent
Servante et al.

(10) Patent No.: US 8,658,253 B2
(45) Date of Patent: *Feb. 25, 2014

(54) PRINTABLE COATING

(75) Inventors: Alastair Hugh Servante, Cumbria (GB); Simon James Read, Cumbria (GB)

(73) Assignee: Innovia Films Limited, Wigton, Cumbria (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/128,536

(22) PCT Filed: Dec. 8, 2009

(86) PCT No.: PCT/GB2009/051670
§ 371 (c)(1),
(2), (4) Date: Jun. 7, 2011

(87) PCT Pub. No.: WO2010/067111
PCT Pub. Date: Jun. 17, 2010

(65) Prior Publication Data
US 2011/0236611 A1    Sep. 29, 2011

(30) Foreign Application Priority Data

Dec. 9, 2008 (GB) .................................. 0822412.3

(51) Int. Cl.
*B05D 3/02* (2006.01)
(52) U.S. Cl.
USPC ........ 427/385.5; 427/395; 427/508; 427/510; 427/511; 427/553

(58) Field of Classification Search
USPC .............. 427/508, 510, 511, 385.5, 395, 553
See application file for complete search history.

(56) References Cited

U.S. PATENT DOCUMENTS

| 4,960,638 A | 10/1990 | Mukoyoshi et al. |
| 5,070,136 A | 12/1991 | Dersch et al. |
| 5,529,893 A | 6/1996 | Valsecchi et al. |
| 5,955,532 A | 9/1999 | Chang et al. |

(Continued)

FOREIGN PATENT DOCUMENTS

| EP | 0474452 | 3/1992 |
| EP | 1371679 | 12/2003 |

(Continued)

OTHER PUBLICATIONS

United Kingdom Patent Office Search Report of Application No. GB0822412.3 dated: Jul. 2009.

(Continued)

*Primary Examiner* — Robert S Walters, Jr.
(74) *Attorney, Agent, or Firm* — Ping Wang; Andrews Kurth, LLP

(57) ABSTRACT

A primer-less coating composition for facestock comprises: a binder being a water-dispersible polymer; an ethylenically unsaturated compound which is aqueous-dispersible and miscible with or bonded to the water-dispersible polymer, wherein the ethylenically unsaturated compound is able to form a covalent bond with an ink; and a crosslinker that is suitable for binding the coating to the facestock. The coating composition may be applied to a substrate to form a printable film. A printed film having the coating may be used in a label, for example for use on a container such as a bottle.

12 Claims, 1 Drawing Sheet

| Primerless Label Face stock |
|---|

| Primerless Top Coat |
|---|
| Corona treatment in air |
| Skin polymer – Functional extrudable polymer. i.e. Propylene-Ethylene-Butylene terpolymer |
| Core polymer; either Isotactic Polypropylene homopolymer, or a Random Propylene - Ethylene copolymer, And potentially voiding and/or pigmenting agents |
| Skin polymer – Functional extrudable polymer. i.e. Propylene-Ethylene-Butylene terpolymer |

(56) References Cited

U.S. PATENT DOCUMENTS

| | | |
|---|---|---|
| 6,387,976 B1 | 5/2002 | Flat |
| 6,723,402 B2 | 4/2004 | Nair et al. |
| 6,844,034 B2 * | 1/2005 | Touhsaent .................. 428/32.1 |
| 7,045,579 B2 | 5/2006 | Van Den Berg et al. |
| 7,060,362 B2 | 6/2006 | Li et al. |
| 7,160,411 B2 | 1/2007 | Williams et al. |
| 7,378,155 B2 | 5/2008 | Gillie |
| 7,455,891 B2 | 11/2008 | Kunz et al. |
| 7,632,562 B2 | 12/2009 | Nair et al. |
| 2002/0098340 A1 | 7/2002 | Servante et al. |
| 2002/0146559 A1 | 10/2002 | Touhsaent et al. |
| 2004/0126507 A1 | 7/2004 | O'Brien |
| 2004/0197572 A1 | 10/2004 | Bell |
| 2005/0112334 A1 | 5/2005 | Servante et al. |
| 2006/0234076 A1 | 10/2006 | Takamatsu et al. |
| 2010/0217186 A1 | 8/2010 | Nazarova et al. |
| 2010/0330375 A1 | 12/2010 | Pajerski et al. |

FOREIGN PATENT DOCUMENTS

| | | |
|---|---|---|
| WO | 97/27064 A1 | 7/1997 |
| WO | 01/60878 | 8/2001 |
| WO | 02/48260 | 6/2002 |
| WO | 2004/060687 A1 | 7/2004 |
| WO | 2007/071328 A1 | 6/2007 |
| WO | 2008/101661 A1 | 8/2008 |
| WO | 201006298 | 1/2010 |
| WO | 2011035178 | 3/2011 |

OTHER PUBLICATIONS

International Search Report and the Written Opinion of the International Searching Authority of International Application No. PCT/GB2009/051670 filed Dec. 8, 2009.

* cited by examiner

| Primerless Label Face stock |
|---|

| Primerless Top Coat |
|---|
| Corona treatment in air |
| Skin polymer – Functional extrudable polymer. i.e. Propylene-Ethylene-Butylene terpolymer |
| Core polymer; either Isotactic Polypropylene homopolymer, or a Random Propylene - Ethylene copolymer, And potentially voiding and/or pigmenting agents |
| Skin polymer – Functional extrudable polymer. i.e. Propylene-Ethylene-Butylene terpolymer |

PRINTABLE COATING

This application claims priority to United Kingdom patent Application No. 0822412.3, filed Dec. 9, 2008.

FIELD

The present invention relates to an improved coating to which print can be applied. In particular, though not exclusively, the present invention relates to an improved printable film having good adhesive properties when used with radiation curable ink.

BACKGROUND

In recent years, diversification of printed products has required printing on a wider variety of materials in sheets; for example, papers, synthetic papers, polymer films such as thermoplastic resin films, metallic foils, metallized sheets, etc. These printed items are printed by methods such as by offset printing, gravure, flexography, screen process printing and letterpress printing. In these printing methods, a method which uses radiation curable ink has recently become popular because radiation curable inks cure rapidly, and the printing method which uses radiation curable ink is of superior handling. Radiation curable inks are known to be useful in the printing of packaging, labels and non absorbing printing materials. Radiation curable printing inks typically contain unsaturated acrylates, polyesters, photoinitiators, and additives. In electron beam cured inks however, the photoinitiators may be omitted.

After deposition of the radiation curable ink on the printable item, the print is exposed to radiation and hardens within a fraction of a second. Printing speeds up to 300 m/min are attained during continuous printing. At present, there is a great demand for sheet-like printable items.

In printing methods, the printing sheet desirably has good sheet running properties and anti-blocking properties, producing uniform spread of the ink over the surface of the sheet, as well as antistatic properties. Besides these generally required properties, in printing methods which use radiation curable ink, the printing sheet requires in particular the property of adhering strongly to radiation cured ink.

In particular, radiation curable ink printed polymer films, intended for use as labels, for example in the bottle labelling market, should be resistant to both freezing water conditions (to allow storage of the resultant product in coolers or ice buckets) and sterilization processes for example by exposure to steam (to ensure pre-labelled bottles are fit for filling).

European patent application EP-A1-410051 discloses printing sheets comprising a support layer and a surface layer on at least one face of said support, said surface layer containing at least an acrylate based polymer and an unsaturated compound (cinnamic acid or derivatives thereof). This document does not teach anything about the possibility of use of other monomers to replace cinnamic acid.

WO-A-02/048260 discloses what are said to be improved binders, ink-receptive compositions and coated substrates containing a binder, a particulate filler and a mordant. Preferred binders include one or more acrylic copolymers made with at least one wet abrasion resistance-enhancing monomer. The coating compositions disclosed therein are fully saturated, with ink receptivity being provided by the mordant and/or the filler.

WO-A-01/60878 discloses co-mingled polyurethane-polyvinyl ester compositions for use as coatings intended for protectivity rather than ink receptivity. This document suggests the use of a water-dispersible UV-hybrid coating which is fully cured during the manufacturing process.

US 2002/0098340 discloses a printable film comprising a substrate and at least a surface layer which covers at least one face of the substrate and which comprises a water dispersible polymer and an ethylenically unsaturated compound. However said product can be expensive and complicated to produce due to its multi-component nature. This document teaches the use of primers intermediate between the substrate and the surface layer to provide a satisfactory level of adherence.

However, the above listed materials formed in sheets, especially polymer films, do not sufficiently adhere to radiation curable ink after printing and curing, especially in these extreme conditions. Accordingly the printed and radiation cured ink is problematic in that the printed and radiation cured ink separates from the polymer film.

Improvements are required in the area of printable films, in order to achieve a product which is cost-effective, easy to manufacture, and which also has appropriate adhesion properties.

SUMMARY

From a first aspect the present invention provides a primer-less coating for facestock, comprising: a binder being a water-dispersible polymer; an ethylenically unsaturated compound which is aqueous-dispersible and miscible with or bonded to said water-dispersible polymer, wherein said ethylenically unsaturated compound is able to form a covalent bond with an ink; and a crosslinker, wherein said crosslinker is suitable for binding the coating to the facestock.

Suitable substrates, which can be used in this invention as the facestock, are polymer films, especially polyolefin films, papers, synthetic papers, woven fabrics, nonwoven fabrics, ceramic sheets, metallic plates, and multilayer composite sheets formed by combination of said materials. For printable film intended for use as labels, polyolefin films are preferred, especially oriented polypropylene films, and still more preferred is an oriented polypropylene film according to EP-A-0202812.

The printable films referred to herein are films which can be directly inked, i.e. a film of which the surface layer is strong enough to resist the pull of the tacky ink, otherwise areas of the surface layer may be pulled away from the surface, giving a defect known as picking.

The coating formulation, resultant coating, and coated products do not comprise a primer. This gives advantages not only in terms of cost but also in terms of production equipment and simplicity. Furthermore, the primer-less systems allow improved printability. The considerable volume of prior art disclosing primers teaches away from the primer-less system of the present application.

In some prior art systems an open printable surface is provided by an interaction between a polymer (for example an acrylic polymer) and an ethylenically unsaturated compound (for example EBECRYL® (silicone diacrylate) from Cytec Industries Inc.). When the film is printed the wet ink adheres to the coated surface and then, when the printed film is radiation-cured, the UV initiators (contained in the ink) start a radical curing reaction which cross-links EBECRYL® with itself and the ink and thus binds the ink on the surface of the film. The skilled person has typically avoided using crosslinkers for the purpose of binding the coating to the film, because of the fear of giving rise to a hard, unprintable film; instead a separate primer layer has usually been used in prior art systems between the film and the coating for the purpose of binding the film to the coating.

BRIEF DESCRIPTION OF THE DRAWING

FIG. 1 shows an example of a coated film in accordance with the present invention.

DETAILED DESCRIPTION

Surprisingly the present inventors have found that a crosslinker can be used in the coating formulation in order to effect the binding, without compromising other qualities such as good printability. The present inventors have found that a crosslinker can be used to bind functional groups on the film surface with functional groups in the components of the coating composition. The crosslinker also provides the film with water-resistance without excessively hardening the product, thereby meaning that the surface can still be readily printed. In fact, improvements in printability are seen.

The crosslinker is used such that it can provide effective adhesion (and optionally also water resistance) whilst also resulting in effective printability. Non-isocyanate crosslinkers are preferred, because the inventors have found that isocyanate can self-crosslink to give a hard, print-resistant, polyurea component. The inventors have obtained good results with carbodiimide and especially aziridine crosslinkers and therefore these crosslinkers are preferred. The skilled person will appreciate that other crosslinkers, which provide the binding effect and result ineffective printability, are also within the scope of the present invention.

The system of the present invention can again be contrasted with primer-based systems of the prior art, wherein a bond is formed by means of the separate primer layer which is present only at the interface between the film and the topcoat and is not present in the topcoat itself.

In the present invention the cross-linker is typically able to react with the ethylenically unsaturated compound, which may or may not form part of and/or be pendant from, the backbone of the water dispersible polymer. Optionally the chemical interaction is a three-way interaction including these two materials and also the polymer, thereby effectively forming a pre-polymer on the film surface for the reception of ink and subsequent curing by the radiation cure.

Furthermore, the cross-linker is typically present in the coating composition in an amount in excess of that required for stoichiometric cross-linking of the water-dispersible polymer. This enables there to be some crosslinker left available to react with the ethylenically unsaturated compound.

In the primerless system of the present invention, the crosslinker is preferably present throughout the coating. The crosslinker preferably reaches from the film (substrate) where it binds to functional groups thereon (for example, acid, hydroxyl and amino groups thereon), all the way through the topcoat where it crosslinks the polymer and interacts chemically with the ethylenically unsaturated compound, to the surface where it locks in the ethylenically unsaturated compound and yet leaves functional groups available on the ethylenically unsaturated compound to bind the ink. It is a key feature of the present invention that the ethylenically unsaturated compound present in the system retain at least some of its unsaturation at the point at which ink is applied to the system. In other words, the coating comprises an ethylenically unsaturated compound which is not cured to any extent that would fully remove ethylenic unsaturation from the compound and prevent its binding to an ink applied to the coating surface. The ethylenically unsaturated compound used in the coating formulation of the invention must have the capacity (through one or more of its ethylenically unsaturated groups) to bind to an ink applied to the coating. A coating formulation originally formulated with an ethylenically unsaturated compound but then cured prior to inking such that insufficient ethylenically unsaturated groups for ink adhesion remain in the coating will not be in accordance with the invention.

The combination of components is such that excess crosslinker can be used without resulting in over cross-linked, hard unprintable film. Some preferred crosslinkers are able to avoid the disadvantages of excess cross-linking by hydrolyzing instead. The following can also play a role, and can be varied by the skilled person accordingly: the reaction with the ethylenically unsaturated compound; the three-way interaction taking into account the polymer; the particular functionality of the materials including for example a limited level of acid functionality in the polymer make-up; the amount of crosslinker; and the monomers chosen when performing the original polymerization.

The mechanism of the chemical interaction between the crosslinker and the ethylenically unsaturated compound may optionally be a base induced nucleophilic addition reaction across the unsaturated (ethylenic) bond, for example a Michael addition or alternatively/additionally a Baylis-Hillman Reaction.

The coating composition is preferably an aqueous-based composition; alternatively a solvent (for example MEK—methyl ethyl ketone—or isopropyl acetate) based system can be used. Organic solvent-based systems may optionally be used in combination with polyester binders, and/or aromatic crosslinkers.

The ethylenically unsaturated compound is preferably dispersible or miscible (as opposed to soluble) in water.

The coating of the present invention may form a layer which covers at least one face of the substrate listed above. The water-dispersible polymer may by way of non-limiting example be selected from water dispersible acrylates, urethanes, urethane acrylates, styrene butadiene/maleic anhydride copolymers and mixtures thereof. The water dispersible polymer forms a smooth, film-formed and ink-receptive surface.

Acrylic polymers used as the water dispersible polymer include (co)polymers obtained by the free-radical addition polymerization of at least one (meth)acrylic type monomer and optionally of other vinylic or allylic compounds. The acrylic polymers provide a smooth film-formed and ink-receptive surface.

A wide variety of acrylic polymers are able to fulfill this requirement. Suitable acrylic polymers are homopolymers of (meth)acrylic acid or alkyl(meth)acrylate, the alkyl radical having 1 to 10 carbon atom, or copolymers of two or more of the said (meth)acrylic type monomer and optionally of other vinylic or allylic compounds.

As stated above, a water dispersible urethane polymer may also suitably be used. As with the acrylic polymer, it is essential that this urethane polymer should be able to provide a smooth film-formed and ink-receptive surface.

A wide variety of urethane polymers are able to fulfill this requirement. Suitable urethane polymers are for example the reaction product of an isocyanate-terminated polyurethane prepolymer formed by reacting at least an excess of an organic polyisocyanate, an organic compound containing at least two isocyanate-reactive groups and an isocyanate-reactive compound containing anionic salt functional groups (or acid groups which may be subsequently converted to such anionic salt groups) or non-ionic groups and an active hydrogen-containing chain extender.

The water dispersible polymer has sufficiently low levels of reactive functional groups to limit the cross-link density in order to provide sufficient water resistance for finished film properties whilst leaving a surface which is receptive to printing inks, said inks being UV-curable, water based or solvent based. Preferably there is less than 10 weight % of reactive functional groups.

The amount of water dispersible polymer is for example 10 to 98%, preferably 60-95%, more preferably 74-92% in terms of the weight after drying of the coating composition.

The surface layer comprises also an ethylenically unsaturated compound.

The ethylenically unsaturated compound is selected to be miscible in the wet stage in the aqueous phase and to be compatible in the dry stage with the water dispersible polymer itself. Consequently, the ethylenically unsaturated compound acts as a plasticiser for the surface layer once hardened allowing the easy penetration of the radiation curable ink thereto. Alternatively, or as well, the ethylenically unsaturated compound may be provided as part of the water dispersible polymer itself—for example as a functional side chain thereof.

The ethylenically unsaturated compound must also be able, when the printed film is submitted to radiation in order to cure the ink, to react with the unsaturated components of the ink which have penetrated into the surface layer.

This reaction between the ethylenically unsaturated compounds of the surface layer and the unsaturated compounds of the radiation curable ink forms chemical bonds between those compounds and simultaneously crosslinks the surface layer, thereby generating the final resistant product.

Preferably, the ethylenically unsaturated compound contains 1 to 10 double bonds per molecule and still more preferably 2 to 5 double bonds per molecule (or per functional group in the event that the compound is provided as a pendant side chain from, or otherwise as part of, the water dispersible polymer).

Suitable ethylenically unsaturated compounds are the ester derivatives of [alpha], [beta]-ethylenically unsaturated acids, such as acrylic or methacrylic acids, itaconic or citraconic acids, maleic or fumaric acids, etc. with polyols or alkoxylated polyols. Other suitable ethylenically unsaturated compounds include derivatives of isocyanate prepolymers or oligomers reacted with ethylenically unsaturated alcohols and ethoxylated variants thereof, such as Desmodur (Bayer) trifunctional isocyanate reacted with hydroxylethyl methacrylate. In other words, ethylenically unsaturated compounds used in accordance with the invention may contain one or more urethane linkages in addition to, or instead of, one or more ester linkages.

The suitable polyols include saturated aliphatic diols such as ethylene glycol, diethylene glycol, triethylene glycol, propylene glycol, dipropylene glycol, tripropylene glycol, butylene glycols, neopentyl glycol, 1,3- and 1,4-butane diols, 1,5-pentane diol, 1,6-hexanediol and 2-methyl-1,3 propanediol. Glycerol, 1,1,1-trimethylolpropane, bisphenol A and its hydrogenated derivatives may also be used. The suitable alkoxylated polyols include the ethoxylated or propoxylated derivatives of the polyols listed above.

Examples of ethylenically unsaturated compounds which can be used according to the invention are polyfunctional acrylates such as difunctional acrylates, such as 1,4-butane diol diacrylate, 1,6-hexane diol diacrylate, neopentyl glycol diacrylate, triethylene glycol diacrylate, polyethylene glycol diacrylate, tripropylene glycol diacrylate, 2,2-dionol diacrylate, bisphenol A diacrylate, etc., trifunctional acrylates such as pentaerythritol triacrylate, trimethylolpropane triacrylate, etc., tetrafunctional acrylates, etc.

It is to be understood that the methacrylate derivatives corresponding to these acrylate derivatives could also be used.

Moreover, it has been found that polyallyl derivatives such as tetraallyloxyethane are also suitable. Suitable materials in this connection are commercially available under the trade name EBECRYL® from Cytec Industries Inc.

The amount of the ethylenically unsaturated compound can for example be from about 2 to about 90% by weight of the acrylic polymer, and preferably is from about 2 to about 15% or 2 to 10% (in the present specification, all percentages are dry weight based).

Suitable cross-linking agents include carbodiimide & aziridine crosslinkers, and cross-linkers disclosed in for example WO 02/31016. The cross-linkers can form bonds between carboxyl, hydroxyl or amine functional groups at the interface between the base and the topcoat.

The crosslinking agent may also improve the hardness and/or water resistance of the surface layer deposited on the film and consequently, of the finished product, whilst resulting in a surface layer which, once hardened, allows the easy penetration of the radiation curable ink thereto.

For example, 1-10% of crosslinker may be used, or more preferably 1-5% or 2-5%.

For example, where the polymer is an acrylic polymer, the amount of the crosslinking agent can be up to 10% by weight of the acrylic polymer, and preferably is from 1 to 5% by weight of the acrylic polymer.

The surface layer can contain all other additional agents, if necessary, for preventing the blocking of one sheet to another, and for improving the sheet running property, antistatic property, non-transparency property, etc. These additional agents are generally added in a total amount not exceeding about 40% by weight of the acrylic polymer. As said additional agent, for example, a pigment such as polyethylene oxide, silica, silica gel, clay, talc, diatomaceous earth, calcium carbonate, calcium sulfate, barium sulfate, aluminium silicate, synthetic zeolite, alumina, zinc oxide, titanium oxide, lithopone, satin white, etc. and cationic, anionic and nonionic antistatic agents, etc. may be used.

For example, an ink adhesion promoter and surface hardener may be used, e.g. colloidal silica. An ink adhesion promoter and surface hardener may for example be present in an amount of 5 to 20%.

Suitable antiblock materials which may be used include silica, clays, non-film forming polymers (e.g. PMMA dispersions and beads), for example in an addition amount of 0.1 to 3%, preferably 0.1 to 1.0%.

Water may be used to give coating solids of approximately 5 to 20%

According to the present invention, the surface layer may be applied as an aqueous dispersion at about 0.5 to about 2.5 g/m$^2$ on the substrate by the method of roll coating, blade coating, spray coating, air knife coating, rod bar coating, reverse gravure, etc. on the substrate and then dried, for example, in a hot air oven.

After the drying step, the surface layer comprises thus the water dispersible polymer, smoothly crosslinked by the crosslinking agent and, included in the acrylic polymer matrix, the ethylenically unsaturated compound. This allows the easy penetration of the radiation curable ink into the surface layer as well as its subsequent reaction with the ethylenically unsaturated compound.

The present invention does not use a primer. However, before applying the surface layer, if sufficient functionality is not available at the surface of the substrate, it can optionally be pretreated in a conventional manner with a view to improve wetting & adhesion. For this purpose, it is possible, for example, to pretreat the substrate by the corona effect, corona discharge, flame, or oxidizing chemicals, but it should be understood that all known techniques aiming at improving the surface of a sheet-like item with a view of the application of a composition, may be suitable.

A reverse face of the substrate, namely a face not covered by the surface layer, can be covered with a pressure-sensitive adhesive layer which consists of a commonly used pressure-sensitive adhesive agent. Furthermore, if necessary, a releasing film or sheet consisting of a releasing agent, can cover the pressure-sensitive adhesive layer. This laminate comprising the printing sheet according to the invention can be used as an adhesive label which may be affixed to most types of surface.

Another aspect of the invention concerns thus a printable film intended for labels comprising a substrate of which only one face is coated with a surface layer and of which the other face is coated with a pressure-sensitive adhesive layer which is itself covered with a releasing film or sheet.

Another aspect of the present invention relates to a process for the manufacture of a printable film comprising the step of coating at least one side of a substrate with an aqueous dispersion comprising a water dispersible polymer and an ethylenically unsaturated compound and a suitable crosslinking agent and optionally conventional additives, and comprising further the step of drying the coating so obtained.

The process of manufacture of a printable film may optionally comprise before the step of coating at least one face of the substrate, a further pretreatment step of the substrate (such as corona discharge treatment).

In a particular embodiment directed to the preparation of labels, only one face of said substrate is coated with a surface layer and the one face-coated substrate so obtained is coated with a pressure-sensitive adhesive or in a variant, the pressure-sensitive adhesive may be transferred from a release liner with which the coated substrate is combined.

Another object of the present inventions concerns a printed film comprising a substrate of which at least one face is coated with a surface layer comprising a water dispersible polymer and an ethylenically unsaturated compound and suitable crosslinker, said coated face of the substrate being printed by conventional methods such as offset printing, gravure, flexography, screen process printing and letterpress printing using radiation curable ink and subsequently radiation cured.

Ink formulations for radiation curing contains generally pigments, vehicle, solvent and additives. The solvents in these systems are low-viscosity monomers, capable of reacting themselves (i.e., used as reactive diluents). The vehicle is usually composed of a resin derived from unsaturated monomers, prepolymers or oligomers such as acrylates derivatives which are able to react with the ethylenically unsaturated compound of the surface layer. For a UV ink, the "additives" contain a large amount of photoinitiators which respond to the photons of UV light to start the system reacting.

A UV ink formulation may be generalized as:

| | |
|---|---|
| Pigment | 15-20% |
| Prepolymers | 20-35% |
| Vehicle | 10-25% |
| Photoinitiators | 2-10% |
| other additives | 1-5%. |

For an electron beam curable ink, the "additives" contain generally no photoinitiator.

The low viscosity monomers, sometimes termed diluents, are capable of chemical reactions which result in their becoming fully incorporated into the ultimate polymer matrix.

The vehicle provides the "hard resin" portion of the formulation. Typically, these are derived from synthetic resins such as for example, urethanes, epoxides, polyesters which have been modified by reaction with compounds bearing ethylenic groups such as for instance (meth)acrylic acid, hydroxyethyl(meth)acrylate, reaction product of caprolactone with unsaturated compounds bearing a hydroxyl group, and the like.

Appropriate adjustments could be made in the selection of the prepolymers and monomers used in order to achieve the required viscosities for the different methods of application.

Another aspect of the invention relates to a process for the manufacture of a printed film comprising the steps of
a) coating a substrate with an aqueous dispersion comprising a water dispersible polymer and an ethylenically unsaturated compound and a suitable crosslinker;
b) drying the coating so obtained;
c) inking the dried coating with radiation-curable ink;
d) curing the ink with UV or EB radiations.

It is to be noted that the different steps of this process may be effected in the same conditions (speed, costs, etc.) as with conventional surface layer.

Finally, the invention concerns also a printed film as obtained by inking a printable film according to the invention, and especially a printed label so obtained.

An example of a coated film in accordance with the present invention is shown, schematically and not to scale, in FIG. 1.

EXAMPLES

The following Examples are given for the purpose of illustrating the present invention and may be coated onto a substrate film in accordance with standard techniques.

Raw materials used in these examples are sourced from the following suppliers: Cytec Surface Specialties S.A./N.V. Anderlechtstraat, 33, 1620 Drogenbos; Alberdingk Boley GmbH Europe Headquarters, Duesseldorfer Str. 53, 47829 Krefeld, Germany; Cray Valley Laporte Road, Stallingborough, North East Lincolnshire, DN41 8DR; Xama Aziridenes Flevo Chemie (Nederland) B.V., Havendijk 8a, 3846 AD Harderwijk, The Netherlands; Gasil Silica INEOSSilicas Limited, Warrington, England WA5 1AB; Baxenden Chemicals Ltd, Paragon Works, Worsley Street, Rising Bridge, Accngton, BB5 2SL; Bayer Material Science 100 Bayer Road, Pittsburgh, Pa. 15205; Grace Davison Oak Park Business Centre, Alington Road, Little Barford, St. Neots, Cambs PE19 6WL; NIPPON SHOKUBAI EUROPE N.V. Haven 1053, Nieuwe Wegl, B-2070 Zwijndrecht, Belgium; Nissando Industries Inc. 1-2-3, Onodai Midori-ku, China; DSM NeoResins+Sluisweg 12, PO Box 123 5140 AC Waalwijk, The Netherlands.

Sample 1

| | |
|---|---|
| Acrylic copolymer (Craymul 8500; Cray Valley) | 82.8 (74.0-90.9)% |
| Silica (Gasil HP250; Crossfield) | 0.2 (0.1-1.0)% |
| Colloidal silica (Ludox ×30; GRACE Davison) | 12 (5-20)% |
| EBECRYL 160 (Cytec) | 3 (2-10)% |
| XAMA-7 (polyfunctional aziridene crosslinker; Bayer Polymers) | 2 (2-5)% |
| Water to give coating solids of approximately | 5-20% |

Sample 2

| | |
|---|---|
| Acrylic copolymer (Craymul 8405; Cray Valley) | 81.5 (74.0-90.9)% |
| Silica (Seahostar KE250; Nippon Shokubai) | 0.5 (0.1-1.0)% |
| Colloidal silica (Bindzil 15/500; GRACE Davison) | 5-20% |
| EBECRYL 160 (Cytec) | 5 (2-10)% |
| PFAZ 322 (polyfunctional aziridene crosslinker; Bayer Polymers) | 3 (2-5)% |
| Water to give coating solids of approximately | 5-20% |

Sample 3

| | |
|---|---|
| PU Dispersion (Witcobond 315-40; Baxenden Chemicals) | 33% |
| Acrylic copolymer (Craymul 8500; Cray Valley) | 42.8 (41.0-57.9)% |
| Silica (Seahostar KE250; Nippon Shokubai) | 0.5 (0.1-1.0)% |
| Colloidal silica (Ludox x30; GRACE Davison) | 15 (5-20)% |
| EBECRYL 160 (Cytec) | 5 (2-10)% |
| XAMA-2 (polyfunctional aziridene crosslinker; Bayer Polymers) | 3.7 (2-5)% |
| Water to give coating solids of approximately | 5-20% |

(The stated ranges in parentheses in the above samples 1 to 3 are preferred ranges for the stated materials, and the stated numbers before the parentheses are specific examples of contemplated formulations within the suggested preferred ranges.)

The following more specific formulations in accordance with the invention were prepared, or prepared in a form suitable for laboratory testing in the absence of a stated antiblock component, and tested as described:

TABLE 1

| Component | Dry % | Description |
|---|---|---|
| Alberdingk U3305 | 76.96 | PU Acrylate dispersion |
| Ludox X30 | 10.00 | Colloidal Silica |
| Antiblock | 1.00 | Particulate PMMA |
| Sartomer CN133 | 7.00 | Aliphatic Oligomer Tri-acrylate |
| Dowfax 2A1 | 0.04 | Dispersion surfactant |
| CX 100 | 5.00 | Aziridene Cross-linker (DSM) |

TABLE 2

| Component | Dry % | Description |
|---|---|---|
| Ucecoat 7655 | 85.00 | PU Acrylate from Cytec with ethylenic unsaturation built on polymer backbone |
| Ludox X30 | 10.00 | Colloidal Silica |
| Antiblock | 1.00 | Particulate PMMA |
| PZ-28 | 4.00 | Aziridene Cross-linker (PolyAziridine, LLC) |

TABLE 3

| Component | Dry % | Description |
|---|---|---|
| Alberdingk U3305 | 76.96 | PU Acrylate dispersion |
| Ludox X30 | 10.00 | Colloidal Silica |
| Antiblock | 1.00 | Particulate PMMA |
| Sartomer CN133 | 7.00 | Aliphatic Oligomer Tri-acrylate |
| Dowfax 2A1 | 0.04 | Dispersion surfactant |
| Carbodilite E-03A | 5.00 | Carbodiimmide Cross-linker (Nissindo Industries) |

TABLE 4

| Component | Dry % | Description |
|---|---|---|
| Ucecoat 7655 | 64.56 | PU Acrylate from Cytec with ethelenic unsaturation built on polymer backbone |
| Ludox X30 | 10.00 | Colloidal Silica (Grace Davidson) |
| Antiblock | 1.00 | Particulate PMMA |
| CX 100 | 4.00 | Aziridene Cross-linker (DSM) |
| R610 | 20.00 | PU Dispersion (DSM) |

TABLE 5

| Component | Dry % | Description |
|---|---|---|
| Ucecoat 7655 | 77.96 | PU Acrylate from Cytec with ethelenic unsaturation built on polymer backbone |
| Ludox X30 | 10.00 | Colloidal Silica |
| Antiblock | 1.00 | Particulate PMMA |
| CX 100 | 4.00 | Aziridene Cross-linker |
| Sartomer 454 | 7.00 | Ethoxylated TMPTA (Sartomer) |
| Dowfax 2A1 | 0.04 | Dispersion Surfactant |

Other more specific formulations contemplated in accordance with the invention are as follows:

TABLE 6

| Component | Dry % | Description |
|---|---|---|
| Alberdingk U3305 | 76.96 | PU Acrylate dispersion |
| Bindzil 30/310 | 10.00 | Colloidal Silica |
| Antiblock | 1.00 | Particulate PMMA |
| EBECRYL ® 1160 | 7.00 | Ethoxylated TMPTA (Cytec) |
| Dowfax 2A1 | 0.04 | Dispersion surfactant |
| CX 100 | 4.00 | Aziridene Cross-linker |

TABLE 7

| Component | Dry % | Description |
|---|---|---|
| Alberdingk U3305 | 76.96 | PU Acrylate dispersion |
| Bindzil 30/310 | 10.00 | Colloidal Silica |
| Antiblock | 1.00 | Particulate PMMA |
| Sartomer 454 | 7.00 | Ethoxylated TMPTA |
| Dowfax 2A1 | 0.04 | Dispersion surfactant |
| Ucarlink XL29SE | 5.00 | Carbodiimmide Cross-linker (Dow Chemicals) |

The systems of these samples and examples should have a usable pot life of approximately 8 to 12 hours before crosslinker is consumed. Nevertheless, addition of further crosslinker revitalizes the formulation, without significant effects on the finished film properties.

After coating of the above specific formulations of Examples 1 to 5 onto a film, the coated film was dried in a hot air oven and then printed in a screen printing process with commercially available UV curable screen inks, at 5 to 15 g/m². Examples are RN752 & 650-CWHD inks from FUJIFILM SERICOL, UVSF-172 ink from PARAGON INKS, RSP Series inks from NORCOTE or Combiwhite USW90004 & UVOSCREEN II™ ink from FLINT INKS.

The printed film so obtained was UV cured using typical commercial conditions UV lamp powers of 100-200 W/cm at typical press speeds of 50-100 m/min.

The printed film finally obtained was tested according to following method:

Exposure to extreme wet conditions at high temperature (typically >90° C.) and low temperature (0° C.) followed by immediate scratch testing. Each of Examples 1 to 5 passed the high temperature test, and Example 3 passed a modified low temperature test at 4° C.

Similar results are expected in relation to each of Examples 6 and 7, and specific Examples formulated in accordance with Samples 1 to 3.

The results showed that the new primerless system of the present invention delivers an excellent printed film suitable for labeling in, for example, the beverage industry.

What is claimed is:

1. A process for the manufacture of a printable film, comprising the steps of:
    coating at least one side of a substrate having two sides with an aqueous dispersion comprising a coating composition for facestock, wherein said composition is formed by combining a binder comprising a water-dispersible polymer, an ethylenically unsaturated compound comprising one or more urethane linkages, which is aqueous-dispersible and miscible with or bonded to said water-dispersible polymer, and a crosslinker to form the coating composition, wherein said crosslinker is an aziridine crosslinker and is provided in an amount sufficient for substantially adhering the coating composition to the facestock without incorporating a primer; and
    drying the aqueous dispersion to form a printable coated product with a dried coating, wherein the coated product does not comprise a primer.

2. The process according to claim 1, wherein the crosslinker is present in the coating composition in an amount in excess of that required for stoichiometric crosslinking of the water dispersible polymer.

3. The process according to claim 1, wherein said aziridine crosslinker is the only crosslinker present in said coating composition.

4. The process according to claim 1, wherein the binder comprises the ethylenically unsaturated compound as part of the backbone of or as a pendant side chain of the water dispersible polymer.

5. The process according to claim 1, wherein said ethylenically unsaturated compound is the only ethylenically unsaturated compound present in said coating composition.

6. A process for the manufacture of a printed film, comprising the steps of:
    coating at least one side of a substrate having two sides with an aqueous dispersion comprising a coating composition for facestock, wherein said composition is formed by combining a binder comprising a water-dispersible polymer, an ethylenically unsaturated compound comprising one or more urethane linkages, which is aqueous-dispersible and miscible with or bonded to said water-dispersible polymer, and a crosslinker to form the coating composition, wherein said crosslinker is an aziridine crosslinker and is provided in an amount sufficient for substantially adhering the coating composition to the facestock without incorporating a primer;
    drying the aqueous dispersion to form a printable coated product with a dried coating, wherein the coated product does not comprise a primer;
    inking the dried coating with a radiation curable ink; and
    curing the ink with ultraviolet or electron beam radiation.

7. The process according to claim 6, wherein the ink is applied to the dried coating at a time when the printable coated produce has been supplied on to a printing station.

8. The process according to claim 6, wherein the coating composition is formulated with the crosslinker in an amount sufficient to form the coating composition, wherein crosslinkers are present throughout the coating and extend from the facestock where they bind to functional groups thereon, all the way through the coating to the opposite surface, wherein they form a three-way chemical interaction between the crosslinker, the water-dispersible polymer and the ethylenically unsaturated compound, but leave functional groups available on the ethylenically unsaturated compound to bind the ink.

9. The process according to claim 6, wherein the crosslinker is present in the coating composition in an amount in excess of that required for stoichiometric crosslinking of the water dispersible polymer.

10. The process according to claim 6, wherein said aziridine crosslinker is the only crosslinker present in said coating composition.

11. The process according to claim 6, wherein the binder comprises the ethylenically unsaturated compound as part of the backbone of or as a pendant side chain of the water dispersible polymer.

12. The process according to claim 6, wherein said ethylenically unsaturated compound is the only ethylenically unsaturated compound present in said coating composition.

* * * * *